Oct. 20, 1942.                J. C. McCUNE                2,299,484
                          TRUCK BRAKE MECHANISM
             Filed June 28, 1940·            4 Sheets—Sheet 1

INVENTOR
JOSEPH C. McCUNE
BY
A. M. Higgins
ATTORNEY

Oct. 20, 1942.  J. C. McCUNE  2,299,484
TRUCK BRAKE MECHANISM
Filed June 28, 1940  4 Sheets-Sheet 2

INVENTOR
JOSEPH C. McCUNE
BY
ATTORNEY

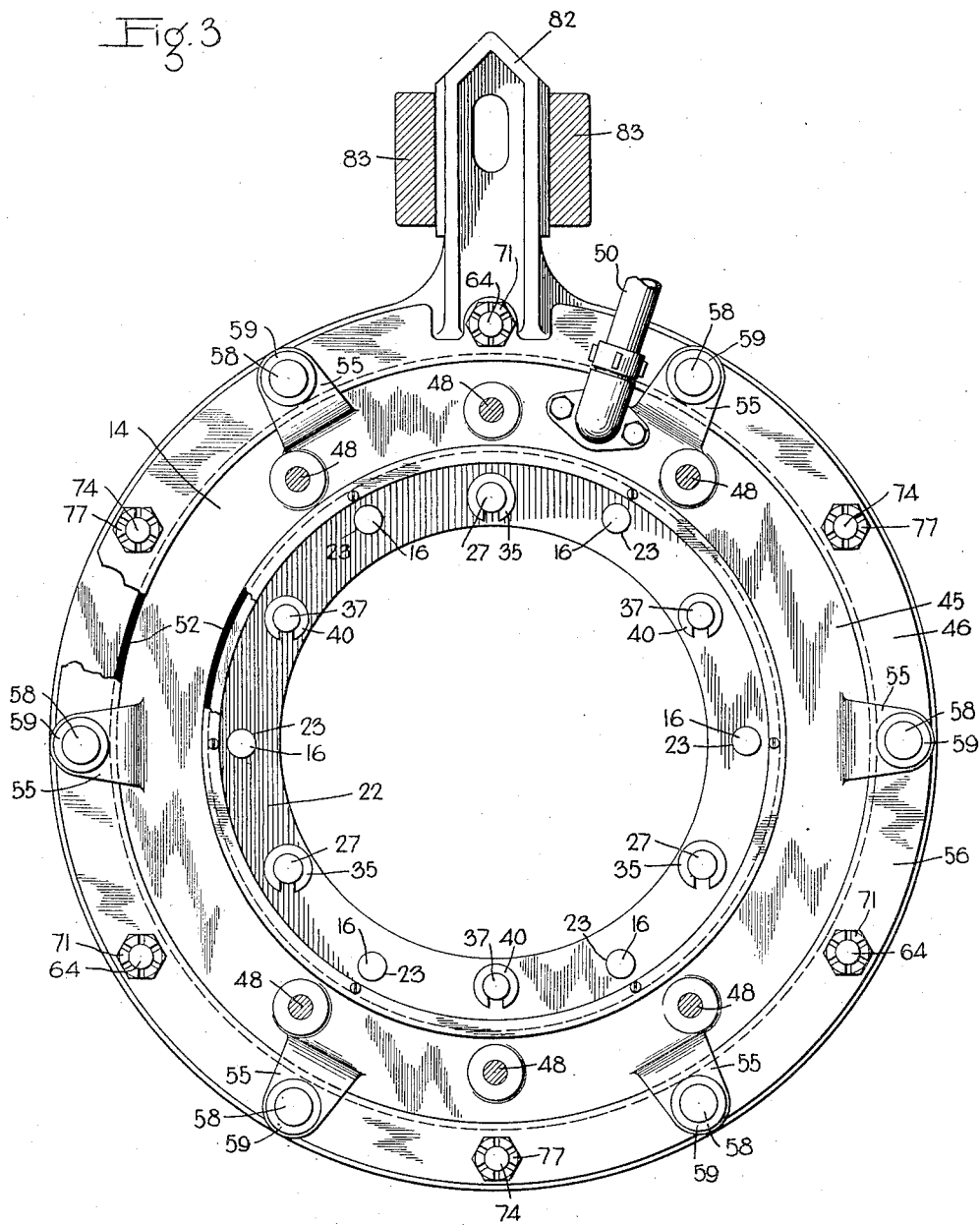

Oct. 20, 1942.    J. C. McCUNE    2,299,484
TRUCK BRAKE MECHANISM
Filed June 28, 1940    4 Sheets-Sheet 4
Fig.6    Fig.4    Fig.5
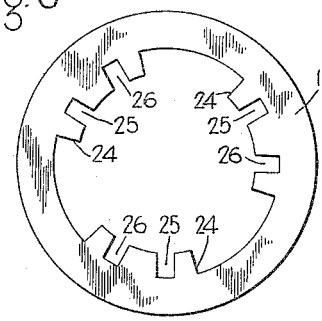
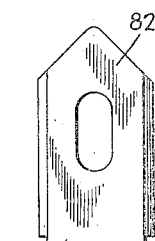
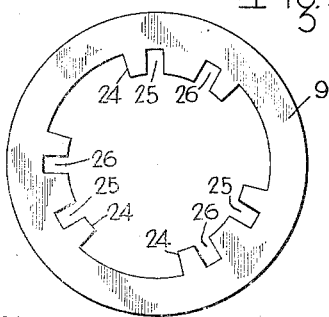
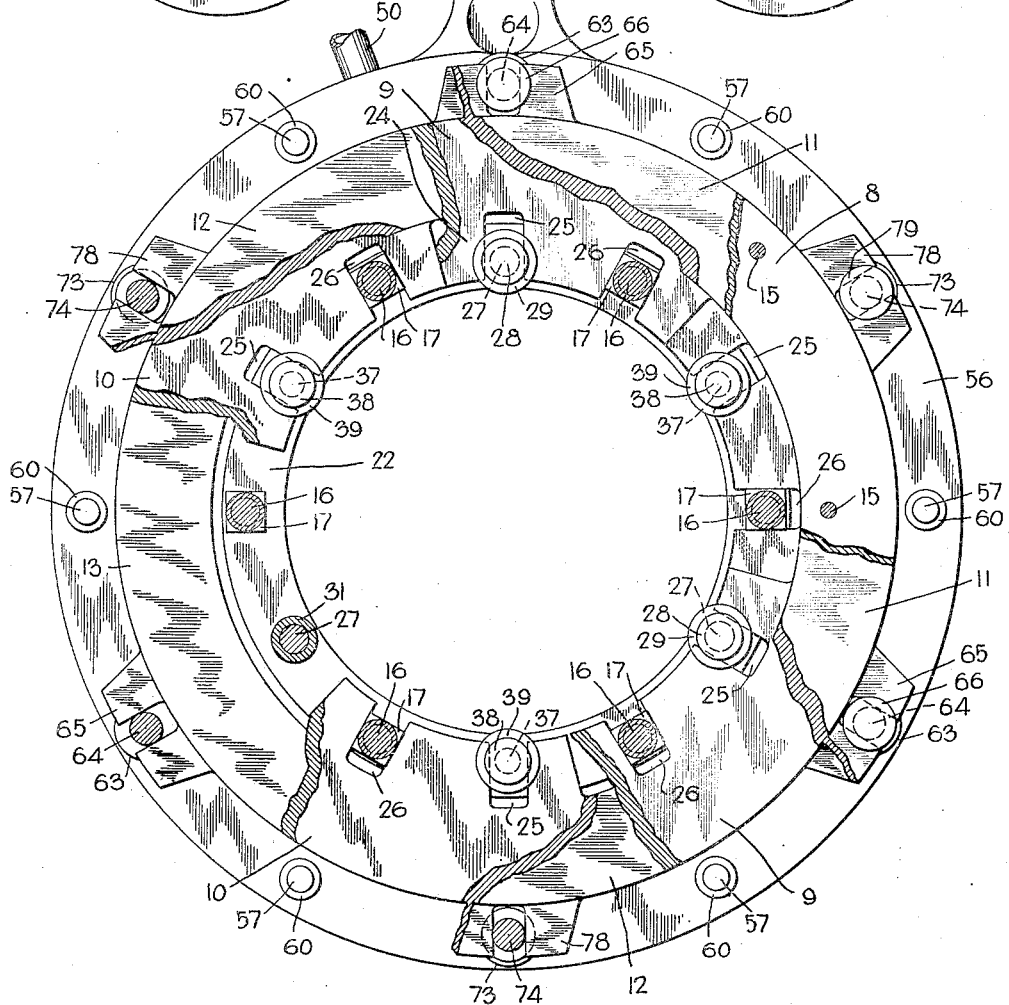
INVENTOR
JOSEPH C. McCUNE
BY
ATTORNEY Patented Oct. 20, 1942

2,299,484

UNITED STATES PATENT OFFICE 2,299,484

TRUCK BRAKE MECHANISM

Joseph C. McCune, Edgewood, Pa., assignor to The Westinghouse Air Brake Company, Wilmerding, Pa., a corporation of Pennsylvania Application June 28, 1940, Serial No. 342,927

19 Claims. (Cl. 188—153)

This invention relates to brake mechanism and more particularly to the disk type of brake mechanism for railway vehicle trucks.

One object of the invention is to provide a novel brake mechanism of this type.

Another object of the invention is to provide a brake mechanism of this type which is particularly adapted though not limited for use on relatively heavy railway vehicles such as tenders of railway locomotives.

Another object of the invention is the provision of a disk brake mechanism which is rugged in construction and at the same time relatively simple and compact for use in limited spaces such as exist between the wheels and truck side frames of certain railway vehicle trucks.

Another object of the invention is the provision of a disk brake mechanism which is adapted to be preassembled at a bench or the like ready for mounting as a unit on a railway vehicle truck.

Other objects and advantages will be apparent from the following, more detailed description of the invention.

Figure 1:
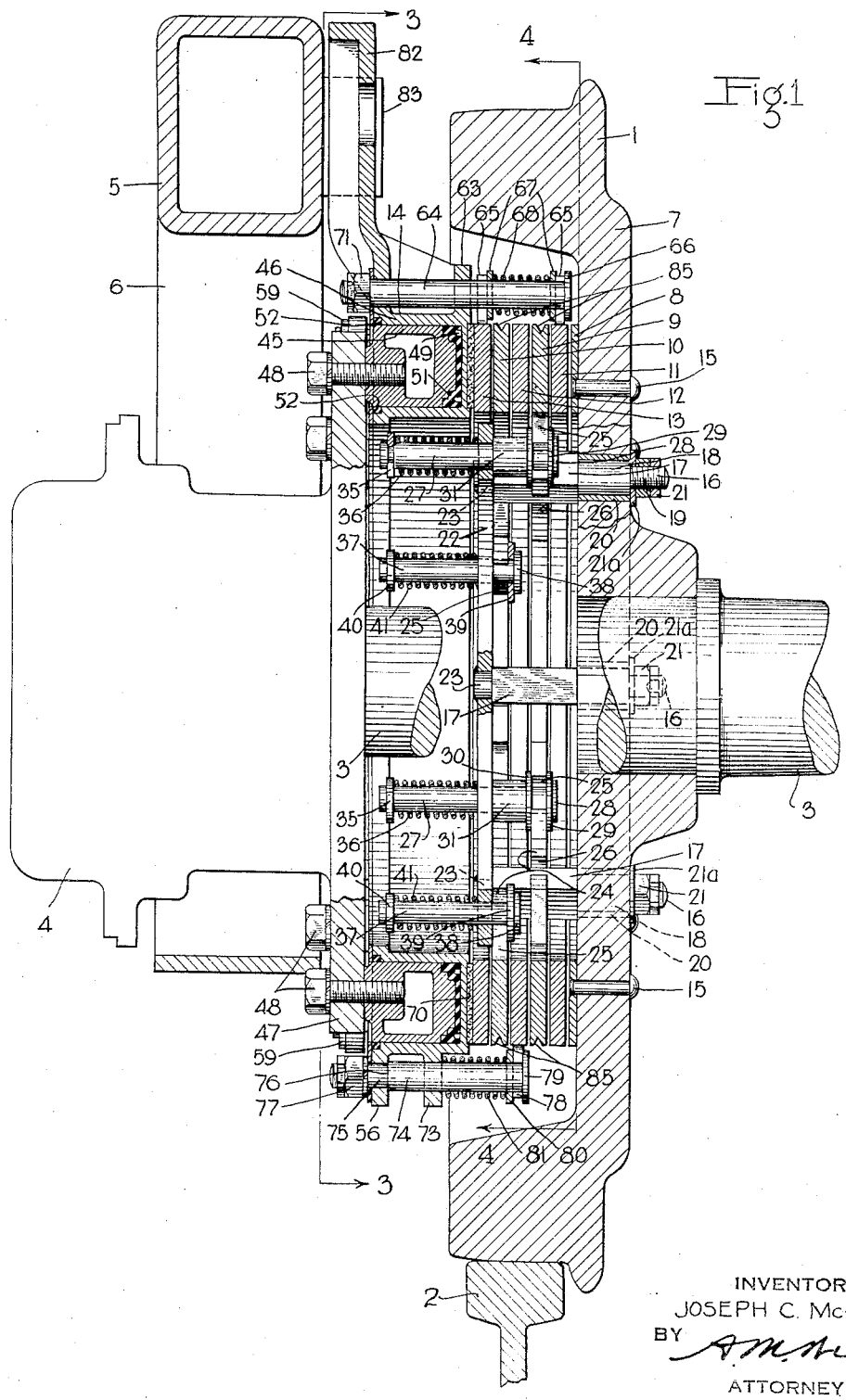
Figure 2:
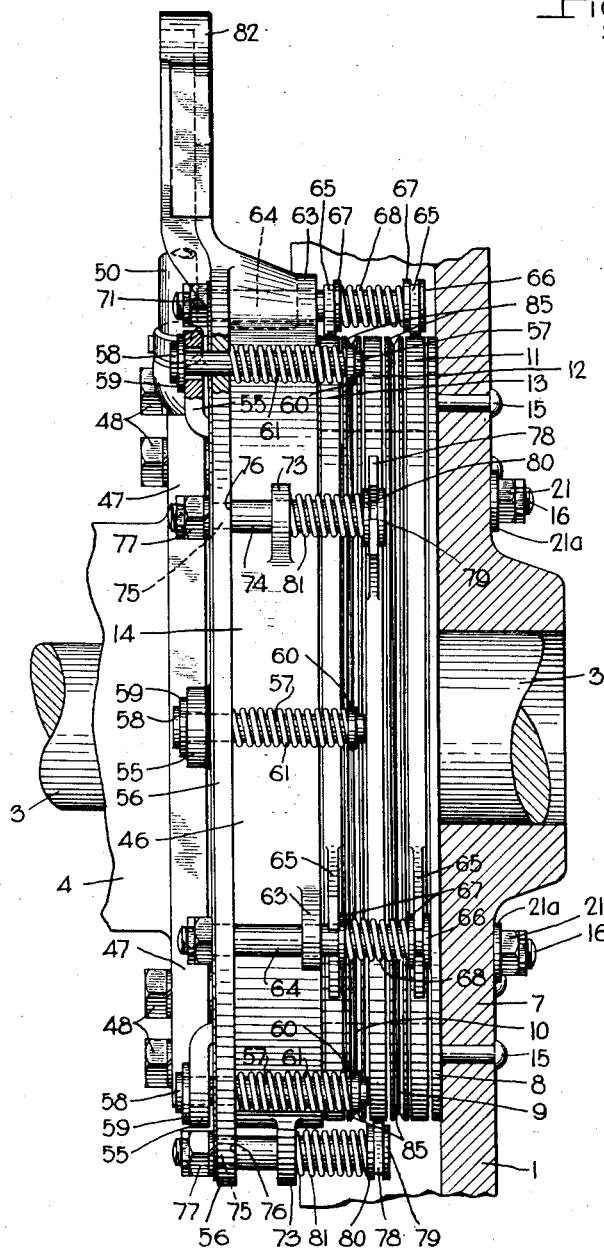

In the accompanying drawings, Fig. 1 is a vertical sectional view of a part of a railway vehicle truck taken through a truck wheel and side frame member and through the brake mechanism embodying the invention; Fig. 2 is a side elevational view of the brake mechanism shown in Fig. 1; Fig. 3 is a view of one end of the brake mechanism taken substantially on the line 3—3 in Fig. 1; Fig. 4 is a view of the opposite end of the brake mechanism taken substantially on the line 4—4 in Fig. 1, various parts of the brake mechanism being broken away to more clearly show interior construction; and Figs. 5 and 6 are end or plan views of two of the brake elements or disks embodied in the brake mechanism.

Description

As shown particularly in Fig. 1 of the drawings, the disk brake mechanism is associated with a truck of the type employed under railway vehicles and which for the purpose of illustration may comprise a wheel and axle assembly including a truck wheel 1 adapted to roll on a rail 2 and an axle 3 extending through and secured to said wheel for rotation therewith. On the portion of axle 3 extending beyond the outside face of the wheel 1 is journalled a journal box 4. A truck side frame member 5 is disposed outboard of the wheel 1 and is provided with the usual depending pedestal legs 6 which are spaced apart and slidably mounted in the usual slots provided in the opposite sides of the journal box 4. The side frame 5 may be spring supported in the usual manner and adapted to move in a vertical direction relative to the journal box 4 and to thus occupy in service various elevated positions with respect to said journal box, depending upon the load carried by the vehicle and resting on the truck frame. Railway vehicle trucks of this type are so well known that a further and more detailed description thereof is not deemed essential to a comprehensive understanding of the invention.

The brake mechanism embodying the invention is wholly disposed in the space between the web 7 of wheel 1 and the inner end of journal box 4 and, briefly, said mechanism comprises three annular rotatable ring-like brake elements or disks 8, 9 and 10, three annular non-rotatable ring-like brake elements or disks 11, 12 and 13 and an annular ring-like brake cylinder device 14 for controlling the braking operation of said brake elements. The brake elements are all preferably of substantially the same inside and outside diameters and are interleaved, with the rotatable brake element 8 at one end of the pile engaging the web 7 on wheel 1, while at the other end of the pile is disposed the non-rotatable brake element 13 engaged by the brake cylinder 14, all of said brake elements and said brake cylinder device encircling the axle 3 and being arranged in coaxial relation with the wheel 1.

Now considering the parts in greater detail, the annular rotatable element 8 is rigidly secured to the web 7 of wheel 1 by a plurality of rivets 15 extending through said element and web. In the annular space provided between the axle 3 and the inner peripheral surfaces of the several brake elements there are provided a plurality of torque bolts 16 equally spaced from each other around the axle on a circle concentric with the axle.

Each of the bolts 16 comprises a portion 17 which is preferably square in shape and which projects from the outer face of the wheel web 7. This square portion 17 is carried by a cylindrical portion 18 which extends through the wheel web 7 to the inside face thereof and beyond said inside face each of the torque bolts has a screw threaded portion 19. The cylindrical portion 18 of each of the torque bolts 16 is encircled by a sleeve 20 having a neat sliding fit thereon and in a bore through the wheel web 7. The length of each sleeve 20 is substantially equal to but does not exceed the thickness of web 7. A nut 21 is provided on the screw threaded portion 19 of each of the torque bolts 16 and bears against a washer 21a which is of great diameter than that of sleeve 20 so as to bear against the inside face of the wheel web 7. The distance across corners of the square portion 17 of each of the bolts 16 is greater than the diameter of sleeve 20 and adapted to bear against the outer face of the wheel web 7 so that upon tightening of the nut 21 on each of the torque bolts 16 the bolt will be rigidly secured to said wheel.

It will be noted that when the bolts are thus rigidly secured to the wheel the sleeves 20 are not subject to pressure on their ends, the only purpose of such sleeves being to fill up the space between the torque bolts and the wheel web for reasons which will be later brought out.

In Fig. 1 all of the annular brake elements are shown spaced apart and disengaged from each other or in their brake release positions.

The squared portion 17 of each of the torque bolts 16 terminates in a plane including the outer end face of the rotatable brake element 10 when in its release position just mentioned. Each of the torque bolts 16 is provided with a portion 23 of reduced diameter which extends beyond the outer end of squared portion 17 through a suitable bore in a ring 22 and has its end either riveted over against the ring or welded thereto.

The annular rotatable brake element 9 is provided with three lug like portions 24 projecting inwardly from the inner peripheral surface thereof and in each of these portions there are provided two radial slots 25 and 26 which are spaced apart, the three radial slots 25 being equally spaced from each other as well as the slots 26, and all of said slots have a width substantially equal to that of the squared portion 17 of the several torque bolts 16 for sliding engagement therewith.

In Fig. 4 the rotatable brake element 9 is shown mounted on three equally spaced torque bolts 16 the squared portions 17 of which are disposed in the three slots 26. If desired the rotatable brake element 9 could be mounted with the squared portions 17 of three equally spaced torque bolts disposed in the slots 25, as will be apparent.

Extending through each of the slots in the rotatable brake element 9 not containing the torque bolts 16, that is, the slots 25 as shown in the drawing, is a release bolt 27 which is mounted to slide in a suitable bore provided through the ring 22. Each of the bolts 27 has a head 28 and between said head and the respective lug like portion 24 of the rotatable brake element is a washer 29 spanning the space across the respective slot and engaging the opposite sides thereof. A like washer 30 is provided on each bolt 27 for engaging the opposite face of the lug like portion of the brake element 9 and interposed between this washer and the ring 22 is a spacer sleeve 31 carried by the bolt. A washer 35 is secured to the opposite end of each release bolt 27 and interposed between and engaging said washer and the ring 22 is a coil release spring 36 which encircles said bolt. Each of the release springs 36 is under compression and is adapted to act through the respective bolt 27 on the rotatable brake element 9 for urging same in the direction of the left hand, as viewed in Fig. 1, to its release position shown and as defined by engagement between the several spacer sleeves 31 and the ring 22 and the lug like portions 24 of said element.

The rotatable brake element 10 may be identical in structure to the rotatable brake element 9 having inwardly extending lug like portions 24 and slots 25 and 26 therein either set of which is adapted to be slidably mounted on the squared portions 17 of the several torque bolts not carrying the rotatable brake element 9. In the drawing the bolts 16 are shown disposed in the slots 25 in the rotatable brake element 10. Such mounting is clearly shown in Fig. 4 from which it will be apparent that the rotatable brake element 9 is carried by three of the torque bolts 16 which are equally spaced apart, while the rotatable brake element 10 is carried by the other three torque bolts.

A release bolt 37 slidably mounted in a suitable bore in ring 22 extends through each of the slots 25 in the rotatable brake element 10 and has a head 38 between which and the respective lug like portion 24 of said element is interposed a washer 39 spanning the slot containing the bolt and engaging the lug like portion at opposite sides of the slot. A washer 40 is secured to the opposite end of each release bolt 37 and interposed between said washer and the ring 22 and encircling the release bolt is a coil release spring 41 which is under compression. The several release springs 41 acting through the bolts 37 are provided for pulling the rotatable brake element 10 in the direction of the left hand as viewed in Fig. 1 into engagement with the ring 22 which is adapted to define the release position of said element, and said springs are adapted to yield to provide for movement of said element in the direction of the truck wheel 1.

From the above description it will be apparent that the rotatable brake elements 9 and 10 are adapted to rotate at all times with the wheel 1 through the medium of the torque bolts 16 and since said elements are slidably mounted on said bolts they are adapted to move in the direction of or away from the wheel 1.

The ring 22 connecting the outer ends of the torque bolts 16 is provided not only to be engaged by the rotatable brake element 10 for defining its release position but also to equalize between the several torque bolts braking forces applied to said bolts by the rotatable brake elements for transmission to the truck wheel 1. The ring 22 is also adapted to rigidly support the several torque bolts in working relation with respect to each other when removed from wheel 1 to facilitate assembly of the brake mechanism to said wheel, as will be later brought out.

The annular brake cylinder device 14 comprises a ring-like piston 45 and a casing 46 having an annular piston chamber in which said piston is mounted. One end of the brake cylinder piston 45 is mounted against lugs 47 provided on the inner end of the journal box 4 and rigidly secured thereto by suitably arranged cap screws 48. The brake cylinder piston 45 is thereby rigidly secured against movement while the casing or cylinder 46 therefore is carried by and mounted to slide on said piston.

Between the inner end of the brake cylinder piston 45 and the piston casing 46 there is provided a pressure chamber 49 which is connected by a passage (not shown) provided through the piston to a fluid pressure supply pipe 50 preferably secured to the outer end face of the piston and through which fluid under pressure is adapted to be supplied to and released from the pressure chamber 49 for controlling the operation of the brake mechanism. A piston packing 51 is secured to the inner end face of the brake cylinder piston 45 for preventing leakage of fluid under pressure from the pressure chamber 49. Adjacent the outer end of the piston 4 there is secured to the casing 46 two felt rings 52, one of these rings being arranged to have sliding contact with the outer peripheral surface of the piston while the other ring is arranged for sliding contact with the inner peripheral surface of the piston, said rings being provided to prevent foreign matter entering the piston bore.

Projecting radially from the outer end face of the brake cylinder piston 45 are a plurality of equally spaced arms 55. The brake cylinder casing 46 has at the end adjacent the journal box an annular flange 56 the diameter of which is substantially equal to the distance across oppositely arranged arms 55. Each of the arms 55 has a bore and the flange 56 of the brake cylinder casing is provided with an aligned bore of somewhat smaller diameter and extending through each of these aligned sets of bores and having a sliding fit in the bore in flange 56 is a release bolt 57. Each of the bolts 57 has a head 58 and interposed between said head and the respective arm 55 is a washer 59. A washer 60 is secured to the opposite end of each bolt 57 and interposed between each of the washers 60 and the inner surface of the brake cylinder flange 56 is a coil spring 61 which encircles the bolt and bears at one end against said washer and at the opposite end against said flange. The several springs 61 are under compression and act on the brake cylinder flange 56 for urging same into engagement with the arms 55 projecting from the brake cylinder piston, said arms defining the brake release position of the brake cylinder casing 46.

At the end opposite the flange 56 the brake cylinder casing 46 has three outstanding lugs 63 which are equally spaced from each other around the periphery of the casing and with one of said lugs arranged at the top of the casing as shown in Fig. 2. Each of the lugs 63 has a bore aligned with a bore through the brake cylinder flange 55 and extending through each of these sets of aligned bores and thus carried by the brake cylinder casing is a bolt 64 which extends across the outside peripheries of the several brake elements to a position over the non-rotatable brake element 11.

Both of the non-rotatable brake elements 11 and 13 are provided with three outstanding lugs 65 which are equally spaced from each other around the outer peripheries of the elements, and each of the lugs is provided with a radially extending slot through which one of the pins 64 extends and has sliding contact with the side walls thereof. The several pins 64 carry the non-rotatable brake elements 11 and 13 and also act during operation, to be later described, to hold said elements against turning relative to the brake cylinder casing 46.

Each of the bolts 64 has a head 66 disposed between the wheel web 7 and a lug 65 on the non-rotatable brake element 11 and engaging said lug. Mounted on each bolt 64 between the lugs 65 of the two brake elements 11 and 13 are two washers 67, the washer engaging the lug 65 projecting from the brake element 11 being secured to the bolt 64 in the position shown, while the other washer is slidably mounted on the bolt. Interposed between the set of washers 67 on each bolt 64 is a spring 68 which encircles the bolt and which is under compression for urging the two non-rotatable brake elements 11 and 13 apart.

It will be noted that the non-rotatable brake element 13 is disposed adjacent the brake cylinder casing 46, and interposed between said casing and brake element is a ring shaped spacer 70 which is made of hard, heat resisting material such as pressed asbestos or the like for insulating the brake cylinder device from heat developed in the brake elements when in frictional braking contact, to be later described.

Beyond the flange 56 of the brake cylinder casing each of the bolts 64 is provided with a nut 71 which acts to hold the respective bolt in place and also provides for adjusting the bolts relative to the brake cylinder casing 46 to positions for centering the non-rotatable brake element 11 between the rotatable brake elements 8 and 9 when in their release positions shown in Figs. 1 and 2 of the drawings. In other words by the proper adjustment of the several nuts 71 the release position of the non-rotatable brake element 11 is obtained with respect to the brake cylinder casing 46, and with said casing in its release position defined by engagement of flange 56 with the arms 55, said element will be positioned mid-way between the rotatable brake elements 8 and 9. With these parts thus conditioned, the springs 68 are adapted to hold the non-rotatable brake element 13 in its release position in engagement with the spacer ring 70 and disengaged from the rotatable brake element 10.

The brake cylinder casing 46 is also provided around its periphery with three outstanding lugs 73 each of which is arranged mid-way between two adjacent lugs 63. A release pin 74 is carried in each of the lugs 73 and is provided on the end adjacent the journal box with a portion 75 of reduced diameter extending through a suitable bore in the brake cylinder casing flange 56. At the junction of the main portion and of the reduced portion 75 of each of the release bolts 74 there is a shoulder 76 which engages the inner face of the brake cylinder casing flange 56, and a nut 77 is provided on the bolt at the opposite side of the flange for rigidly securing the bolt to the flange.

The three release bolts 74 extend through apertures provided in three suitably aligned lugs 78 extending from the outer peripheral surface of the non-rotatable brake element 12 and on the wheel side of said lugs each of the bolts is provided with a head 79 engaging the respective lug. At the opposite side of each of the lugs 78 a washer 80 is mounted on the release bolt 74 and interposed between said washer and the lug 73 on the brake cylinder casing 46 is a coil spring 81 one end of which engages the lug while the other end acts on the washer 80. The three springs 81 are under compression and thus operative to urge the non-rotatable brake element 12 in the direction of the right hand to its release position defined by engagement of the lugs 78 with the bolt heads 79 as shown in the drawing.

The positioning of the non-rotatable brake elements 11, 12 and 13 in their release positions as above described is dependent upon the brake cylinder casing 46 also being in its release position effected by operation of spring 57 and defined by engagement with the arms 55 projecting from the brake cylinder piston. It will be noted that the bolts 64 and 74 not only carry the non-rotatable brake elements 11 and 13, and 12 respectively, but they are also adapted to secure said elements against rotation relative to the brake cylinder casing 46 during braking which will be later described.

The brake cylinder casing 46 has an integrally formed upwardly extending torque arm 82 disposed adjacent the inner face of the truck side frame 5 and adapted to slide in a slot formed between two lugs 83 extending inwardly from the side frame in a direction transversely of the truck. This structure provides for usual vertical movement of the truck side frame 5 relative to the journal box 4 and to the brake cylinder casing torque arm 82 and also provides for movement on said arm relative to the side frame transversely of the truck as required for operation of the brake mechanism.

Assembling of the brake mechanism and mounting same on a vehicle truck

All parts of this brake mechanism are adapted to be assembled on a bench or the like prior to mounting same on a vehicle truck, as shown in Fig. 1.

When thus assembled all parts will occupy substantially the relative positions shown in the drawings. The annular rotatable braking elements will be inter-leaved in their proper working relationship with the annular non-rotatable brake elements which will be mounted on their respective bolts along with the release springs therefor, and said bolts will be properly secured to the brake cylinder casing. The brake cylinder piston 45 will be in place in the brake cylinder casing and the release springs 61 and bolts 57 will be operatively connecting same to the arms 55 projecting from the brake cylinder piston 45. The annular rotatable brake elements 9 and 10 will be mounted on the torque pins 16 which will be projecting from one end of the assembly and said pins will be rigidly held in operating relation by the ring 22.

When it is desired to apply a preassembled brake mechanism such as just described to a vehicle truck the application must be effected prior to mounting of the truck frame 5 and journal box 4 in their operating positions. It is of course understood that the rotatable brake element 8 is separate from the brake assembly just described and must be secured to the outer face of the truck wheel 1 before application of said assembly.

Assuming that the rotatable brake element 8 is in position, the brake mechanism assembly just described is mounted over the end of the axle 3. The bushings 20 in the wheel web 7 are at this time removed so that as the brake mechanism is brought up against the wheel web 7 the torque bolts 16 are readily inserted through the openings in the wheel 1. Due to the weight of the brake unit assembly the mounting thereof against the outer face of the wheel is facilitated with the bushings 20 removed due to the fact that it is less difficult to line up the torque bolts 16 for passing through openings of relatively greater diameter.

After the brake mechanism assembly is thus mounted against the outer face of wheel 1 with the torque bolts 16 extending through the wheel web 7, the bushings 20 are applied over the ends of the torque bolts and with a lever or the like the assembly is adjusted to permit the bushings 20 to be lined up with the openings in the wheel web 7 in which they are adapted to fit. The bushings 20 are then started into their respective bores by manual pressure or otherwise, following which the washers 21a and nuts 19 are applied to the bolts 16 and drawn home. As the nuts 19 are thus screwed home the bushings 20 are pressed into place and the squared portions 17 of the torque bolts 16 are rigidly drawn into contact with the outer face of the wheel web 7, thereby rigidly securing the several torque bolts, the ring 22 and the rotatable brake elements 9 and 10 to the wheel 1 for rotation therewith.

It will be noted that if in mounting the brake mechanism on the wheel 1 one of the torque bolts 16 is positioned above the axle 3 on the vertical center line thereof and the bushing 20 is first applied thereto, the application of the bushings 20 to the other bolts will be facilitated. The bores in wheel 1 in which the bushings 20 are disposed may be such that the bushings can be inserted by hand if desired, it being noted however that the fit between the bushings and the torque bolts and wheel must be sufficiently tight to prevent any looseness between the torque bolts and the wheel 1 in a direction circumferentially of the wheel.

After the brake mechanism assembly is thus secured to the wheel 1 the journal box 4 may be mounted over the end of the axle and the lugs 47 thereon lined up with the brake cylinder piston 45 following which the cap screws 48 may be applied to secure said piston rigidly to said lugs. The truck frame may then be lowered into position with the pedestal legs 6 disposed in the usual slots provided at the opposite side of the journal box 4, and during such mounting the torque arm 82 projecting from the brake cylinder casing 46 is lined up to pass between the lugs 83 projecting from the truck side frame member 5. The brake mechanism is now in condition to operate to brake the wheel 1.

Operation

When it is desired to brake the wheel 1 fluid under pressure is supplied to pipe 50 through which it flows to pressure chamber 49 at the pressure face of the piston 45 and therein acting on the brake cylinder casing 46 effects movement thereof relative to said piston and to the truck side frame 5 in the direction of the truck wheel 1, it being noted that during such movement the torque arm 82 moves relative to the lugs 83 crosswise of the truck frame.

As the brake cylinder casing 46 is thus operated the bolts 64 and thereby the non-rotatable brake elements 11 and 13, and the bolts 74 and thus the intermediate non-rotatable brake element 12 are all moved together in the direction of the wheel 1 until the non-rotatable brake element 11 contacts the rotatable brake element 8 at which time the non-rotatable brake elements 12 and 13 will also be in substantial engagement with the rotatable brake elements 9 and 10, respectively.

Since the washers 67 which engage the lugs 65 projecting from the non-rotatable brake element 11 are welded to bolts 64 further movement of the brake cylinder casing 46 in the direction of the truck wheel 1 is then relative to said bolts, said casing sliding on said bolts as also does the non-rotatable brake element 15 which moves with the brake cylinder casing.

After the non-rotatable brake elements are moved into contact with the rotatable brake elements as just described, the further movement of the brake cylinder casing 46 in the direction of the wheel 1 acts through the non-rotatable brake element 13 to move the rotatable brake element 10 along the squared portions 17 of the supporting torque bolts 16 in the direction of wheel 1, and at the same time this movement of the brake cylinder casing acts through the springs 81 to urge the rotatable brake element 9 along the squared portions 17 of the torque bolts 16 in the direction of the non-rotatable brake element 11 against the opposing pressure of springs 36 acting through the release bolts 27. This movement of the brake cylinder casing 46 continues until all of the brake elements are moved into contact with each other after which the pressure of fluid acting in the pressure chamber 49 of the brake cylinder casing presses said elements into frictional interengagement.

The torque arm 82 secures the brake cylinder casing 46 against rotation and said casing acting through the bolts 64 and 74 also holds the several non-rotatable brake elements against rotation, so that as the brake elements are pressed into frictional interengagement the non-rotatable brake elements create a drag on the rotatable brake elements, which transferred through the torque bolts 16 to the wheel 1 effects braking thereof. The degree with which the wheel is thus braked will vary in proportion to the pressure of fluid supplied to pressure chamber 49 for forcing the several brake elements into frictional interengagement and this pressure may be varied in any well known manner or by any suitable means to provide any desired degree of braking of the wheel 1.

When the several brake elements are forced into frictional interengagement to brake wheel 1, heat is developed in the brake elements and the spacer 70 acts at this time to minimize the transfer of such heat to the brake cylinder device so as to prevent premature deterioration of the piston packing 51 and also to prevent melting of the lubricant in the brake cylinder and possible loss thereof.

In the peripheral face of each of the rotatable brake elements 9 and 10 there is provided an annular, preferably V-shaped groove 85 the purpose of which is to increase the area of the peripheral surfaces of the elements which is in contact with the atmosphere and rotating therein. These grooves provide for a greater dissipation of heat from the brake elements directly to the atmosphere that would otherwise be obtained and as a consequence act in conjunction with the spacer 70 to minimize the amount of heat transferred to the brake cylinder device.

It will be noted that since the brake cylinder casing is connected through the torque arm 82 to the truck frame 5, the force holding the non-rotatable brake elements against rotating during braking is transferred to the truck frame and that the journal box 4 is independent of such torque force, and this is desirable in order to prevent turning of said journal box between the pedestal legs 6 which might result in fouling thereof against the pedestal legs 6 so that the truck frame would not be free to move vertically relative to the journal box.

During an application of brakes there will be a tendency on the part of the brake cylinder casing 46 to turn slightly relative to the brake cylinder piston 45 due particularly to looseness between various parts of the truck structure, and in order to avoid binding between the brake cylinder casing and piston under this condition the bores in the arms 55 projecting from the brake cylinder piston and through which the release pins 57 for said casing extends are somewhat greater in diameter than said pins, as hereinbefore mentioned.

It will be noted that the movable part of the brake cylinder device, which in the illustration is the brake cylinder casing 46, not only supports the non-rotatable brake elements but also acts during braking to hold same against rotation with the rotatable brake elements. Furthermore, during braking the brake cylinder casing and the non-rotatable brake elements are in more compact relation than when the brakes are released, as shown in the drawing, and it will therefore be apparent that the leverage of the non-rotatable brake elements tending to bend their supporting pins 64 and 74 is reduced to a very minimum.

The non-rotatable brake elements are held against rotation during braking by engagement between the lugs 65 and 78 projecting from the outer peripheries thereof and their respective release bolts which are cylindrical in form, while the rotatable brake elements act to transfer braking force produced in the brake mechanism to the truck wheel 1 through the inwardly extending lugs 24 engaging the torque bolts 16. The contacting surfaces on the bolts 16 and lugs 24 are flat to provide a relatively large bearing surface as compared to those between the non-rotatable brake elements and their release bolts which are cylindrical in form. By this construction the connection between the rotatable brake elements and torque bolts with the consequent relatively short lever arms for transmitting braking force to the wheel 1 will wear no faster than the connection between the non-rotatable brake elements and their release bolts which have longer lever arms. In other words this structure provides just as long life for the rotatable brake elements as inherently exists in the non-rotatable brake elements.

When it is desired to effect a release of the brakes on the truck, the fluid under pressure is vented from the brake cylinder piston chamber 49 through the pipe 50 thereby relieving the pressure on the several brake elements. The several springs 61 acting on the brake cylinder casing 46 then effect movement thereof relative to the brake cylinder piston 45 back to its release position defined by engagement of said casing with arms 55 projecting from the brake cylinder piston. During this return movement of the brake cylinder casing to its release position, the several release springs act to move the rotatable and non-rotatable brake elements back to their release positions in the reverse order of movement in applying the brakes. When all of the parts are thus returned to their release positions, the several brake elements are all disengaged from each other as shown so that the wheel 1 and the rotatable brake elements 8, 9, and 10 which are secured to said wheel are again free to rotate therewith.

*Summary*

From the above description, it will be seen that the brake mechanism is rugged, relatively simple and compact, and particularly adapted for use in limited spaces which exist on certain railway vehicle trucks. All parts of the brake mechanism, excluding the rotatable brake element 8 which is secured directly to the wheel 1, may be preassembled at a bench or the like remote from the truck to which it will be applied, thereby providing for most efficient fitting and assembling of the parts at points where the most competent workmen and suitable tools are available. As a preassembled unit the brake mechanism may then readily be applied to a truck when and where desired with less skilled workmen, and with the simplest of tools with the assurance that the brake mechanism will efficiently operate as intended over a relatively long period of time. The structure is also adapted to minimize wear and distortion of parts since in addition to the novel design of various details, the parts are so arranged that during braking the mechanism is in a more compact form than when the brakes are released, this feature being obtained by carrying the non-rotatable brake elements from the movable part of the brake cylinder device which also acts during braking to hold said non-rotatable parts against rotation.

While only one embodiment of the invention has been shown and described in detail, it is not the intention to limit the scope to that embodiment or otherwise than by the terms of the appended claims.

Having now described my invention, what I claim as new and desire to secure by Letters Patent, is:

1. A disk brake mechanism for a wheel of a railway vehicle truck, comprising, a pile of interleaved annular rotatable and non-rotatable friction brake elements arranged in coaxial relation and operative upon frictional interengagement to effect braking of said wheel, means securing the rotatable brake elements to said wheel for rotation therewith, an annular brake cylinder device disposed at one end of said pile in coaxial relation therewith and comprising a stationary part and a movable part, said movable part being operative upon supply of fluid under pressure to a chamber formed between said parts to press said pile of brake elements into frictional interengagement to effect braking of said wheel, a plurality of members arranged around said movable part in spaced relation with respect to each other carrying the non-rotatable brake elements and securing same against turning relative to said movable part, and means securing said movable part against rotation.

2. A disk brake mechanism for a wheel of a railway vehicle truck, comprising, a pile of interleaved annular rotatable and non-rotatable friction brake elements arranged in coaxial relation with said wheel, means securing the rotatable brake elements to rotate with said wheel, an annular brake cylinder device arranged in coaxial relation with said brake elements at one end of said pile and comprising a stationary part and a movable part, said movable part being movable by fluid under pressure supplied to a chamber between the two parts to force said brake elements into frictional interengagement to brake said wheel, means acting on the opposite end of said pile of elements for rendering said movable part of said brake cylinder device effective, a plurality of members spaced around and carried by said movable part and supporting said non-rotatable brake elements and securing same against turning relative to said movable part, and means securing said movable part of said brake cylinder device against turning with said rotatable brake elements and providing for movement thereof in the direction of said pile of elements.

3. A disk brake mechanism for a wheel of a railway vehicle truck, comprising, a pile of interleaved annular rotatable and non-rotatable friction brake elements arranged in coaxial relation with said wheel, means securing the rotatable brake elements to rotate with said wheel, an annular brake cylinder device arranged at one end of said pile in coaxial relation therewith and comprising a stationary piston and a movable casing carried by said piston and movable axially thereof to force said pile of elements into frictional interengagement, said brake cylinder device having a pressure chamber between said piston and casing to which fluid under pressure is adapted to be supplied for effecting movement of said casing, a plurality of bolts arranged around and carried by said casing for supporting the non-rotatable brake elements and operative to hold same against turning relative to said casing, and means securing said casing against turning with said rotatable brake elements.

4. A disk brake mechanism for a wheel and axle assembly of a railway vehicle truck, comprising, a pile of annular interleaved rotatable and non-rotatable friction brake elements arranged in coaxial relation with said assembly, the brake element at one end of said pile being a rotatable brake element fixed against axial movement and all other brake elements being capable of axial movement, the brake element at the opposite end of said pile being a non-rotatable braking element, an annular brake cylinder device arranged at said opposite end of said pile of brake elements in coaxial relation therewith and comprising a stationary part and a movable part carried by said stationary part and movable axially thereof for forcing said brake elements into frictional interengagement and against the rotatable brake element at the end of said pile opposite said brake cylinder device to effect braking of said assembly, said brake cylinder device having a chamber between the stationary and movable parts to which fluid under pressure is adapted to be supplied for actuating said movable part, a plurality of bolts spaced around and carried by said movable part of said brake cylinder device carrying the non-rotatable brake elements and operative to hold said non-rotative brake elements against turning relative to said movable part, and means securing said movable part of said brake cylinder device against turning with the rotatable brake elements.

5. A disk brake mechanism for a wheel and axle assembly of a railway vehicle truck, comprising, a pile of annular interleaved rotatable and non-rotatable friction brake elements arranged in coaxial relation with said assembly, the brake element at one end of said pile being a rotatable brake element fixed against axial movement and all other brake elements being capable of axial movement, the brake element at the opposite end of said pile being a non-rotatable braking element, an annular brake cylinder device arranged at said opposite end of said pile of brake elements in coaxial relation therewith, said brake cylinder device comprising a movable part and a stationary part carried by said movable part and having a brake release position defined by engagement with said stationary part, means for urging said movable part to said release position, said movable part being movable axially from said release position upon supply of fluid under pressure to a chamber formed between the two parts for effecting movement of the axially movable brake elements in the direction of the fixed rotatable brake element at the opposite end of said pile and into frictional interengagement to effect braking of said wheel, a plurality of bolts spaced around and carried by said movable part, means projecting from said non-rotatable brake elements engaging said bolts for supporting said non-rotatable brake elements and for holding same against turning relative to said stationary part, spring means carried by said bolts acting on said non-rotatable elements urging same to brake release positions with respect to said movable part, spring means acting on said rotatable brake elements urging same to release positions with respect to said non-rotatable brake elements when in their release positions, and means securing said movable part to a portion of said truck for holding same and thereby said non-rotatable brake elements against rotation with said rotatable brake elements.

6. A disk brake mechanism adapted to be mounted in the space between a wheel and journal box of a railway vehicle truck, having a truck frame mounted on said journal box and movable vertically relative thereto, said mechanism comprising an annular rotatable friction brake element secured to rotate with said wheel in coaxial relation therewith, an annular non-rotatable friction brake element for frictionally engaging said rotatable brake element, an annular brake cylinder device arranged in coaxial relation with said brake elements and comprising a stationary part rigidly secured to said journal box and a movable part carried by said stationary part and movable axially thereof to effect movement of said non-rotatable brake element into frictional engagement with said rotatable brake element, said brake cylinder device having a chamber between the two parts to which fluid under pressure is adapted to be supplied to effect said axial movement, means carried by said movable part supporting said non-rotatable brake element and securing same against turning relative to said movable part, and means connecting said movable part to said truck frame for holding said movable part and thereby said non-rotatable brake element against turning, the connection between said movable part and frame providing for vertical movement of said frame relative to said movable part and axial movement of said movable part relative to said frame.

7. A disk brake mechanism adapted to be mounted in the space between a wheel and journal box of a railway vehicle truck, having a truck frame mounted on said journal box and movable vertically relative thereto, said mechanism comprising an annular rotatable friction brake element secured to rotate with said wheel in coaxial relation therewith, an annular non-rotatable friction brake element for frictionally engaging said rotatable brake element, an annular brake cylinder device arranged in coaxial relation with said brake elements and comprising a stationary part rigidly secured to said journal box and a movable part carried by said stationary part and movable axially thereof to effect movement of said non-rotatable brake element into frictional engagement with said rotatable brake element, said brake cylinder device having a chamber between the two parts to which fluid under pressure is adapted to be supplied to effect said axial movement, means carried by said movable part supporting said non-rotatable brake element and securing same against turning relative to said movable part, a torque arm projecting vertically from said movable part, said truck frame having a vertically extending opening in which said torque arm is disposed to provide for vertical movement of said frame relative to said movable part, and said opening being arranged to provide for movement of said arm transversely of said frame upon axial movement of said movable part.

8. A disk brake mechanism for a wheel and axle assembly of a railway vehicle truck having a journal box mounted on said axle and having a truck side frame mounted on said journal box, said brake mechanism comprising a pile of annular interleaved rotatable and non-rotatable friction brake elements disposed in the space between said wheel and journal box in coaxial relation with said wheel, the brake element at the end of said pile adjacent the wheel being a rotatable brake element secured to said assembly for rotation therewith and against axial movement, and the brake element at the opposite end of said pile being an axially movable non-rotatable brake element, an annular brake cylinder device disposed beyond said opposite end of said pile in coaxial relation therewith and comprising a stationary part rigidly secured to said journal box and a movable part slidably supported by said stationary part and cooperating therewith to form a chamber to which fluid under pressure is adapted to be supplied for effecting movement of said movable part in the direction of said wheel to force said pile of brake elements into frictional interengagement for braking said assembly, a plurality of bolts arranged around and carried by said movable part and extending over the outer peripheries of the non-rotatable brake elements in said pile and connected to said non-rotatable brake elements for supporting same and for holding same against turning relative to said movable part, spring means operative on said movable part to effect movement thereof relative to said stationary part and in a direction away from said pile of brake elements to a brake release position, means associated with said stationary part engageable by said movable part for defining said release position, spring means carried by said bolts operative on said non-rotatable brake elements for urging same to brake release positions with respect to said stationary part, spring means associated with said rotatable brake elements for urging same to brake release positions with respect to the release positions of said non-rotatable brake elements, and means connecting said stationary part to said truck side frame member for holding said stationary part and thereby said non-rotatable brake elements against turning with said rotatable brake elements.

9. A disk brake mechanism for a wheel and axle assembly of a railway vehicle truck having a journal box mounted on said axle and having a truck side frame mounted on said journal box, said brake mechanism comprising a pile of annular interleaved rotatable and non-rotatable friction brake elements disposed in the space between said wheel and journal box in coaxial relation with said wheel, the brake element at the end of said pile adjacent the wheel being a rotatable brake element secured to said assembly for rotation therewith and against axial movement, and the brake element at the opposite end of said pile being an axially movable non-rotatable brake element, an annular brake cylinder device disposed beyond said opposite end of said pile in coaxial relation therewith and comprising a stationary part rigidly secured to said journal box and a movable part slidably supported by said stationary part and cooperating therewith to form a chamber to which fluid under pressure is adapted to be supplied for effecting movement of said movable part in the direction of said wheel to force said pile of brake elements into frictional interengagement for braking said assembly, a plurality of bolts arranged around and carried by said movable part and extending over the outer peripheries of the non-rotatable brake elements in said pile, said non-rotatable brake elements having lugs equally spaced around the outer peripheries thereof and projecting therefrom, the lugs on the non-rotatable brake element adjacent said brake cylinder device and on another of said non-rotatable brake elements cooperating with certain of said bolts for supporting same and for holding same against turning relative to said stationary part, the lugs on another of said non-rotatable brake elements cooperating with other of said bolts for supporting same and for holding same against turning relative to said stationary part, spring means acting on said movable part for moving same to a brake release position with respect to said stationary part, spring means acting on said non-rotatable brake elements for urging same to brake release positions with respect to said stationary part, spring means associated with the rotatable brake elements for urging same to release positions with respect to the release positions of said non-rotatable brake elements, and means associated with said stationary part and cooperating with a part of said truck frame side member for securing said stationary part and thereby said non-rotatable brake elements against turning with said rotatable brake elements.

10. A disk brake mechanism for a wheel and axle assembly of a railway vehicle truck having a journal box mounted on said axle and a truck frame side member mounted on said journal box, said brake mechanism comprising an even number of annular rotatable and non-rotatable friction brake elements interleaved with each other in coaxial relation with the rotatable brake element at one end of the pile of brake elements disposed adjacent the wheel of said assembly and the non-rotatable brake element at the opposite end of the pile disposed adjacent said journal box, means securing said one rotatable brake element to said wheel for rotation therewith and against axial movement relative thereto, means securing the other rotatable brake elements to rotate with said assembly and providing for axial movement thereof in the direction of said one rotatable brake element, said non-rotatable brake elements being movable axially, an annular brake cylinder device comprising a stationary part and a movable part carried by said stationary part and movable axially relative to said stationary part in the direction of said assembly for effecting movement of said pile of elements into frictional interengagement to brake said assembly, means including springs connecting the two parts of said brake cylinder device and operative on said movable part to move same relative to said stationary part to a release position, means for defining said release position, a plurality of bolts arranged around said movable part and carried thereby, means projecting from said non-rotatable brake elements connected with said bolts for supporting said non-rotatable brake elements and for holding same against turning relative to said stationary part, spring means associated with said bolts operative on said non-rotatable elements for effecting movement thereof to brake release positions with respect to said stationary part, means for defining the release positions of said non-rotatable brake elements, spring means acting on the axially movable rotatable brake elements for effecting movement thereof to release positions with respect to the release positions of said non-rotatable brake elements, the two parts of said brake cylinder device cooperating to form a chamber to which fluid under pressure is adapted to be supplied for effecting movement of said stationary part in the direction of said pile of elements to move said elements into frictional interengagement to effect braking of said wheel, and a torque arm extending vertically from said stationary part cooperating with a portion of said truck frame side member for holding said stationary part and thereby said bolts and non-rotatable brake elements against turning with said rotatable brake elements.

11. A disk brake mechanism for a wheel and axle assembly of a railway vehicle truck, comprising, a pile of annular interleaved rotatable and non-rotatable friction brake elements arranged in coaxial relation with said assembly, the brake element at one end of said pile being a rotatable brake element fixed against axial movement and all other brake elements being capable of axial movement, the brake element at the opposite end of said pile being a non-rotatable braking element, an annular brake cylinder device arranged at said opposite end of said pile of brake elements in coaxial relation therewith, and comprising a stationary part and a movable part carried by said stationary part and movable axially thereof in the direction of said pile for forcing said brake elements from release positions in which they are spaced apart against the brake element at the end of said pile opposite said brake cylinder device and thereby into frictional interengagement, said brake cylinder device having a chamber between the two parts to which fluid under pressure is adapted to be supplied for actuating said movable part, means securing said rotatable brake elements to rotate with said assembly, means securing said movable part against rotation with said rotatable brake elements, and means carried by said movable part supporting said non-rotatable brake elements and securing same against rotation relative to said movable part, the last named means including a plurality of bolts arranged around said pile of elements in spaced relation with respect to each other and extending parallel to the axis thereof and having one end secured to the non-rotatable brake element closest to the wheel for axial movement therewith, each of said bolts having a sliding support connection with said movable part of said brake cylinder device providing for movement of said movable part relative to said bolts.

12. A disk brake mechanism for a wheel and axle assembly of a railway vehicle truck, comprising, an annular rotatable friction brake element, an annular non-rotatable friction brake element, both of said brake elements being arranged in coaxial relation with said assembly, means securing said rotatable brake element to said assembly for rotation therewith, means supporting said non-rotatable brake element and securing same against turning, and a brake cylinder device operative to effect frictional interengagement between said brake elements for braking said wheel, the means securing said rotatable brake element to said assembly for rotation therewith comprising a plurality of torque bolts arranged around the axis of said assembly in spaced relation with respect to each other and having a driving connection with circumferentially spaced portions of said rotatable brake element, and a ring carried by said torque bolts independently of said assembly and rigidly secured to one end of each of said torque bolts, the opposite ends of said torque bolts being rigidly connected to said assembly thereby providing a rigid braking connection between said rotatable brake element and said assembly.

13. A disk brake mechanism for a wheel and axle assembly of a railway vehicle truck, comprising, a pile of annular rotatable and non-rotatable friction brake elements arranged in coaxial relation with said assembly and operative upon frictional interengagement to effect braking of said assembly, a brake cylinder device for actuating said brake elements, means securing the non-rotatable brake elements against turning, and means connecting the rotatable brake elements to said assembly for transmitting brake torque from said rotatable brake elements to said assembly, the last named means comprising a plurality of torque bolts spaced around said assembly and having one end rigidly and removably secured to said assembly to provide a braking connection between said rotatable brake elements and assembly, and a ring having a rigid connection only with the opposite ends of said torque bolts for supporting same in spaced relation.

14. A disk brake mechanism for a wheel and axle assembly of a railway vehicle truck, comprising, a pile of annular rotatable and non-rotatable friction brake elements arranged in coaxial relation with said assembly and operative upon frictional interengagement to effect braking of said assembly, a brake cylinder device for actuating said brake elements, means securing the non-rotatable brake elements against turning, and means connecting the rotatable brake elements to said assembly for transmitting brake torque from said rotatable brake elements to said assembly, the last named means comprising a ring independent of said assembly and disposed in the space within said pile of brake elements, a plurality of torque bolts spaced around said axle and having one end rigidly secured to said ring supporting same, and means rigidly securing the opposite ends of said torque bolts to said assembly, said rotatable brake elements having inwardly extending portions provided with slots to receive said torque bolts to thereby provide a braking connection between said rotatable brake elements and said assembly.

15. A disk brake mechanism for a wheel and axle assembly of a railway vehicle truck, comprising, a pile of annular rotatable and non-rotatable friction brake elements arranged in coaxial relation with said assembly and operative upon frictional interengagement to effect braking of said assembly, a brake cylinder device for actuating said brake elements, means securing the non-rotatable brake elements against turning, and means connecting the rotatable brake elements to said assembly for transmitting brake torque from said rotatable brake elements to said assembly, the last named means comprising a plurality of torque bolts arranged around said axle in spaced relation and encircled by said rotatable brake elements, means separate from said assembly connected to one end of said torque bolts rigidly supporting same in spaced relation, the opposite ends of said torque bolts being disposed in bores in said assembly provided around the axle thereof, said bores being of greater diameter than that of the encircled portions of said torque bolts, a bushing in each of said bores having a sliding fit therein and on the portion of the torque bolt therein, removable means rigidly securing said torque bolts to said assembly, said rotatable brake elements having lugs projecting therefrom and provided with slots in which said torque bolts are disposed to provide a brake force transmitting connection from said rotatable brake elements to said wheel.

16. A disk brake mechanism for a wheel and axle assembly of a railway vehicle truck, comprising, an annular rotatable friction brake element, an annular non-rotatable friction brake element arranged in coaxial relation with said rotatable element, means operative to effect frictional interengagement between said elements for braking said assembly, means supporting said non-rotatable brake element and securing same against rotation, and means securing said rotatable brake element to rotate with said assembly, the last named means comprising a plurality of torque bolts spaced around the axis of said brake elements and secured to rotate with said assembly, said rotatable brake elements having lugs extending in the direction of said torque bolts, said lugs having slots in which said torque bolts are disposed to provide a driving connection between said rotatable brake element and assembly, the openings in said lugs having oppositely disposed and straight substantially radially formed surfaces, and the portion of said torque bolts disposed in said slots having oppositely arranged flat sides in sliding contact over substantially their full radial length with the opposite sides of said openings.

17. A disk brake mechanism for a wheel and axle assembly of a railway vehicle truck, comprising, an annular friction brake element, an annular non-rotatable friction brake element, said elements being arranged in axial relation and being operative upon frictional interengagement to effect braking of said assembly, means operative to effect frictional interengagement between said brake elements, a plurality of bolts spaced around and extending parallel to the axis of said brake elements over the outer peripheral surface of said non-rotatable brake element, means securing said bolts against rotation around said axis, said non-rotatable brake element having lugs extending from the outer peripheral surface thereof and provided with openings in which said bolts are disposed for securing said non-rotatable brake element against turning, said lugs being slidable on said bolts and having a bearing contact with opposite sides of said bolts of a width less than the diameter of said bolts, and means providing a driving connection between said rotatable brake element and assembly comprising a plurality of torque bolts spaced around the axis of said brake elements and rigidly secured in spaced relation and for rotation with said assembly, said rotatable brake element encircling said torque bolts and having inwardly extending lugs provided with slots in which said torque bolts are disposed for supporting said rotatable brake element and for providing a driving connection between said rotatable brake element and torque bolts, the openings in the lugs in said rotatable brake element having straight oppositely disposed surfaces extending substantially radially thereof and the portion of said torque bolts disposed in said openings having oppositely arranged flat sides in sliding contact with said surfaces throughout substantially their full radial length.

18. A disk brake mechanism for mounting between a wheel and a journal box of a railway vehicle truck and adapted to be preassembled before association with said truck, said mechanism comprising a pile of interleaved annular rotatable and non-rotatable friction brake elements and an annular brake cylinder device arranged at one end of said pile of elements in coaxial relation therewith, said brake cylinder device comprising a stationary part adapted to be rigidly secured to the inner end of said journal box and a part carried thereby and movable relative thereto in an axial direction for forcing said pile of brake elements into frictional interengagement for braking said wheel, the movable part of said brake cylinder device being movable axially of the stationary part in the opposite direction to a release position to provide for disengagement of said brake elements in said pile and movement thereof to brake release positions, spring means operatively connecting the two parts of said brake cylinder device for moving the movable part relative to the stationary part to its release position, means on said stationary part engageable by said movable part for defining its release position, a plurality of bolts carried by said movable part and extending over the outer peripheral surfaces of said non-rotatable brake elements, said non-rotatable brake elements having outwardly projecting lugs provided with openings in which said bolts are disposed for supporting said non-rotatable brake elements and for holding same against turning relative to said movable part, said movable part having an outwardly extending torque arm adapted to have a sliding connection with a portion of said truck other than said journal box for securing same and thereby said non-rotatable brake elements against turning, means associated with and carried by said bolts acting on said non-rotatable brake elements for effecting movement thereof to their release positions upon movement of the movable part of said brake cylinder device to its release position, means supporting said rotatable brake elements in interleaved relation with said non-rotatable brake elements comprising a ring encircled by said brake elements, a plurality of torque bolts disposed in spaced relation around said ring at one end thereof and having one end rigidly secured to said ring, said rotatable brake elements having inwardly extending lugs provided with openings spaced to receive said torque bolts to provide a driving connection between said rotatable brake elements and torque bolts and for supporting said rotatable brake elements, removable means for rigidly securing the opposite ends of said torque bolts to said wheel to provide a braking connection between said rotatable brake elements and wheel and means associated with the rotatable brake element supporting means for moving said rotatable brake elements to brake release positions.

19. A disk brake mechanism for mounting between a wheel and a journal box of a railway vehicle truck and adapted to be preassembled before association with said truck, said mechanism comprising a pile of interleaved annular rotatable and non-rotatable friction brake elements and an annular brake cylinder device arranged at one end of said pile of elements in coaxial relation therewith, said brake cylinder device comprising a stationary part adapted to be rigidly secured to the inner end of said journal box and a part carried thereby and movable relative thereto in an axial direction for forcing said pile of brake elements into frictional interengagement for braking said wheel, the movable part of said brake cylinder device being movable axially of the stationary part in the opposite direction to a release position to provide for disengagement of said brake elements in said pile and movement thereof to brake release positions, spring means operatively connecting the two parts of said brake cylinder devices for moving the movable part relative to the stationary part to its release position, means on said stationary part engageable by said movable part for defining its release position, a plurality of bolts carried by said movable part and extending over the outer peripheral surfaces of said non-rotatable brake elements, said non-rotatable brake elements having outwardly projecting lugs provided with openings in which said bolts are disposed for supporting said non-rotatable brake elements and for holding same against turning relative to said movable part, said movable part having an outwardly extending torque arm adapted to have a sliding connection with a portion of said truck other than said journal box for securing same and thereby said non-rotatable brake elements against turning, means associated with and carried by said bolts acting on said non-rotatable brake elements for effecting movement thereof to their release positions upon movement of the movable part of said brake cylinder device to its release position, means supporting said rotatable brake elements in interleaved relation with said non-rotatable brake elements comprising a ring encircled by said brake elements, a plurality of torque bolts disposed in spaced relation around said ring at one end thereof and having one end rigidly secured to said ring, said rotatable brake elements having inwardly extending lugs provided with openings spaced to receive said torque bolts to provide a driving connection between said rotatable brake elements and torque bolts and for supporting said rotatable brake elements, the opposite ends of said torque bolts being provided with a portion of reduced cross-sectional area providing a shoulder at the junction of the two portions of each bolt, the truck wheel having openings to receive the portions of said torque bolts of reduced cross-sectional area, said bores being of greater diameter than said portions of reduced cross-sectional area but of less diameter than across shoulders whereby said shoulders are adapted to engage the wheels beyond the bores, a bushing in each of said bores having a sliding fit therein and filling the space between the side wall of the bore and the outer peripheral surface of the portion of the torque bolt disposed therein, the reduced portion of the torque bolt extending beyond the face of said wheel engaged by the shoulder thereof, removable securing means on the extended portion of each torque bolt engaging said wheel beyond the periphery of the bushing for rigidly securing the torque bolt to the wheel, and means associated with the rotatable brake element supporting means for moving said rotatable brake elements to brake release positions.

JOSEPH C. McCUNE.